Feb. 20, 1968   D. TOMEN   3,369,823
TRAILER
Filed May 13, 1966   2 Sheets-Sheet 1
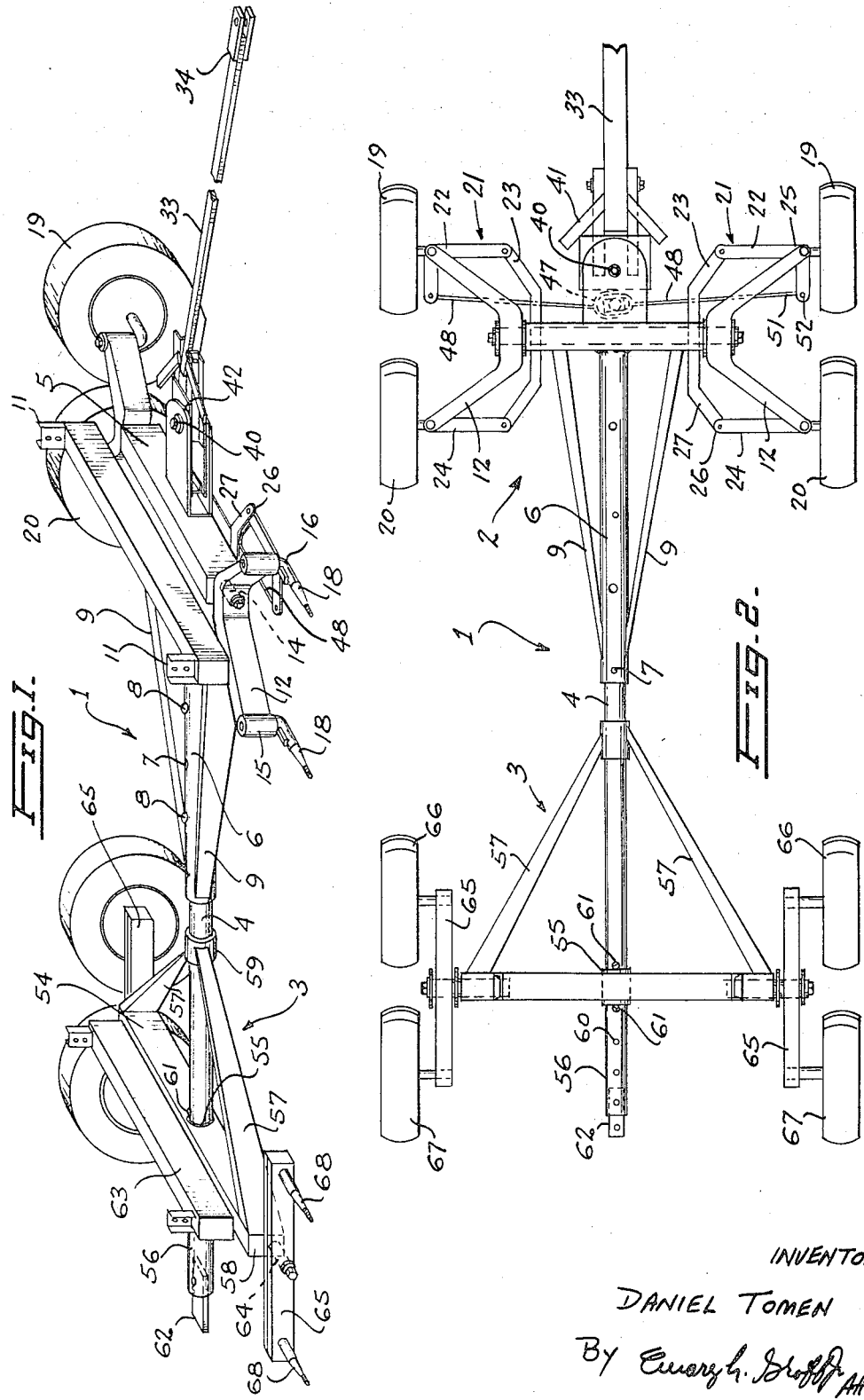
INVENTOR
DANIEL TOMEN
BY Emory L. Groff
Atty

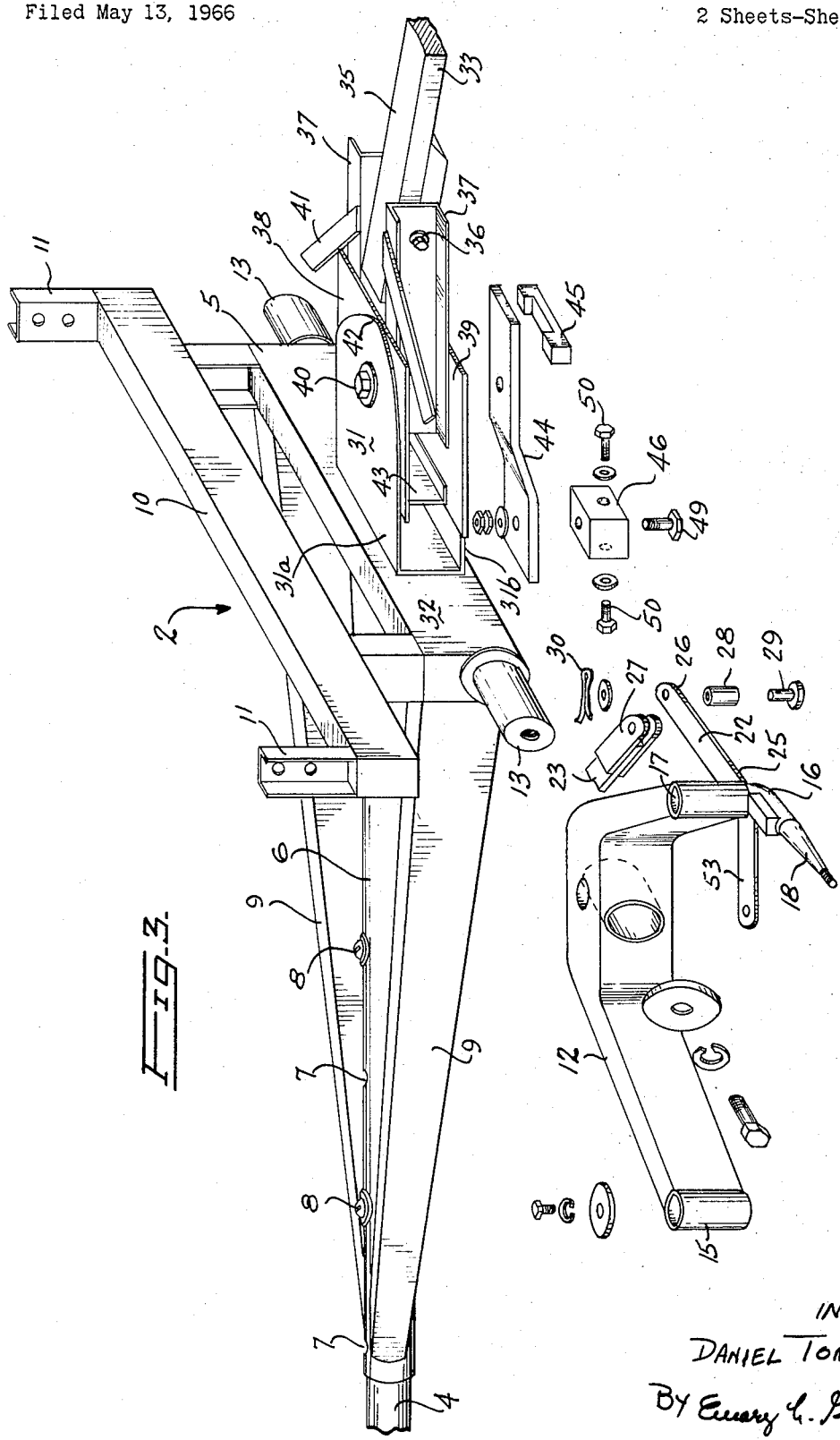

United States Patent Office 3,369,823
Patented Feb. 20, 1968

3,369,823
TRAILER
Daniel Tomen, 34 Devon Road, Chatham,
Ontario, Canada
Filed May 13, 1966, Ser. No. 549,916
Claims priority, application Canada, Apr. 1, 1966,
957,168
4 Claims. (Cl. 280—103)

This invention relates to a trailer, and in particular to a trailer including a steering mechanism for wheels arranged in tandem.

Generally, multi-wheel trailers include relatively complicated steering mechanisms, such as complex linkage systems driven by hydraulic motors, for turning the trailer in a small area. Furthermore, the solution of the short-turn problem often gives rise to suspension problems, i.e. problems involving the suspending of the trailer body on the wheels to reduce vibration of the trailer.

The object of the present invention is to provide improvements in respect of these problems by providing a trailer of relatively simple construction which can be turned in a relatively short area.

Accordingly, the invention relates to a trailer comprising:

(a) a frame having front and rear cross-bars;
(b) a tow bar for connecting the trailer to a towing vehicle, said tow bar being pivotally connected to said frame for pivoting about a first vertical axis;
(c) at least one rear wheel mounted on each end of said rear cross-bar for rotation about a horizontal axis;
(d) a yoke pivotally mounted at its centre on each end of said front cross-bar for pivoting about a horizontal axis defined by said cross-bar;
(e) a front wheel mounted for rotation about a horizontal axis on each free end of said yoke, said wheel being mounted on said yoke to pivot about a further vertical axis; and
(f) steering means interconnecting (b) and (e) whereby pivoting of said tow bar about said first vertical axis produces a corresponding pivoting of each said front wheel about its further vertical axis for steering the trailer.

The invention will now be described in detail with reference to the accompanying drawings which show, by way of example only, a preferred embodiment of the invention, and wherein:

FIGURE 1 is a perspective view of a preferred form of trailer;

FIGURE 2 is a plan view of the trailer of FIGURE 1;

FIGURE 3 is an exploded view of the front section of the trailer of FIGURE 1.

Referring to the drawings, the trailer includes a frame 1 formed of front and rear sections, 2 and 3 respectively, and a longitudinally extending centre shaft 4 interconnecting the sections 2 and 3.

The front section 2 includes a cross-bar 5 with a sleeve 6 extending rearwardly from the centre thereof longitudinal of the frame 1. The sleeve 6 is provided with a plurality of apertures 7 for receiving pins 8 which secure the front section 2 to the centre shaft 4, the latter also being provided with cooperating apertures (not shown) adjacent its front end. The apertures 7 are suitably spaced to permit adjustment of the length of the frame by moving the front portion 2 relative to the centre shaft 4. A pair of diagonal braces 9 are connected to the cross-bar 5 adjacent its ends and to the sleeve 6 to prevent lateral twisting of the front section 2 relative to the centre shaft 4.

A bolster 10 is mounted on the cross-bar 5 for supporting the front end of a load, and is provided with vertical posts 11 at its ends for retaining the load.

A generally V-shaped yoke 12 is centrally mounted for pivoting about a transverse horizontal axis, on each of the free ends 13 of a shaft 14 extending fixedly through the cross-bar 5. The free ends of each of the yokes 12 are provided with cylindrical bosses 15 in each of which a vertical arm 17 of a stub axle 16 is mounted for pivoting about a vertical axis. The stub axles 16 are in the shape of right angles and have horizontal arms 18 rotatably supporting wheels 19 and 20.

The wheels 19 and 20 on each yoke 12 are interconnected by connecting means in the form of a connecting linkage 21 extending between the wheels 19 and 20 to cause the latter to pivot in unison about the vertical axes defined by the vertical arms 17 of stub axles 16. The connecting linkage 21 is formed of three rods 22, 23 and 24. One end 25 of each of rods 22 and 24 is fixedly secured to a stub axle 16 at the junction of its arms 17 and 18, and the other end 26 is pivotally connected to a respective bifurcated end 27 of the rod 23 by bearing 28, cotter 29 and pin 30.

A horizontally disposed, generally U-shaped bracket 31 projects forwardly from the front face 32 of the cross-bar 5 for receiving a tow bar 33. The leading end 34 of the tow bar 33 is bifurcated for connecting the trailer to a towing vehicle, such as a tractor (not shown). The trailing end 35 of the tow bar 33 is swingably mounted, for movement about a transverse horizontal axis defined by bolt 36, between a pair of C-beam sections 37. A top and bottom plate 38 and 39 are secured to the rear ends of the beam sections 37 for pivotally mounting the end 35 of the tow bar 33 in the bracket 31 for pivoting about a vertical axis defined by a bolt 40. A pair of stop means in the form of arms 41 extending diagonally rearwardly from the tops of beam sections 37 are engageable with the arcuate front edge 42 of the top 31a of the bracket 31 to limit pivoting of the tow bar 33 about the bolt 40. The plates 38 and 39 are interconnected at their rear ends by a C-beam section 43.

Linkage means interconnects the trailing end 35 of the tow bar with the wheels 19. The linkage means includes a rearwardly extending stepped steering lever 44 which is pivotally mounted on the base 31b of the bracket 31 by means of the bolt 40 and a bracket 45. The swivel block 46 mounted on the bottom surface of the lever 44, adjacent its rear end is embraced by and connected to bifurcated ends 47 of the tie bars 48 to form a joint permitting the tie bars 48 to swing about a vertical axis defined by bolt 49, and about a horizontal axis defined by bolts 50. The other end 51 of each of the tie bars 48 is connected by a ball joint 52 to one end of one of the arms 53, the other end of such arm 53 being connected to a stub axle 16.

The rear section 3 of the frame 1 includes a cross-bar 54 with an aperture 55 extending therethrough for slidably receiving the trailing end 56 of the centre shaft 4. A pair of diagonal braces 57 are connected to the ends 58 of the cross-bar 54 and to a sleeve 59 slidably mounted on the centre shaft 4 between the front and rear sections. A plurality of apertures 60 are provided adjacent the trailing end 56 of the centre shaft 4 for receiving pins 61 which lock the cross-bar 54 in one of several positions. Thus the length of the trailer can be adjusted by moving either the front section or the rear section, or both, relative to the centre shaft 4. The trailing end 56 of the centre shaft 4 is provided with a telescoping lug 62 for connecting a second trailer, or another vehicle to the trailer. A bolster 63 similar to bolster 10 is mounted on the cross-bar 54 for supporting the rear end of a load.

A shaft 64 is fixedly mounted in each end of the cross-bar 54 for pivotally supporting a bar 65 for pivoting about the transverse horizontal axis defined by the shaft 64. Wheels 66 and 67 are rotatably mounted on stub axles 68 mounted in the bar 65 adjacent each of its ends.

In operation, the leading end 34 of the tow bar 33 is connected to a tractor for towing the trailer. When the tractor turns, the tow bar turns with it about the bolt 40, which movement is transmitted through the steering lever 44, swivel block 46, tie bars 48 and arms 53 to the wheels 19 causing the latter to turn in the same direction as the tractor. The connecting linkage 21 interconnecting wheels 19 and 20 cause the wheels 20 to turn in unison with the wheels 19. If one of the wheels 19 or 20 hits a bump, or enters a depression the yoke 12 pivots about the horizontal axis defined by shaft 14. The joint formed by swivel block 46 and the bifurcated ends 47 of tie bars 48, and the ball joint 52 enable proper operation of the linkage between wheels 19 and tow bar 33 when the wheels 19 and 20 are at different levels. The back wheels 66 and 67 on each side of the frame are free to pivot about the horizontal axis defined by shaft 64.

I claim:
1. A trailer comprising:
 (a) a frame having front and rear cross-bars;
 (b) a tow bar for connecting the trailer to a towing vehicle, said tow bar being pivotally connected to said frame for pivoting about a first vertical axis;
 (c) at least one rear wheel mounted on each end of said rear cross-bar for rotation about a horizontal axis;
 (d) a yoke pivotally mounted at its centre on each end of said front cross-bar for pivoting about a horizontal axis defined by said cross-bar;
 (e) a front wheel mounted for rotation about a horizontal axis on each free end of said yoke, said wheel being mounted on said yoke to pivot about a further vertical axis; and
 (f) steering means interconnecting said tow bar and each said front wheel whereby pivoting of said tow bar about said first vertical axis produces a corresponding pivoting of each said front wheel about its further vertical axis for steering the trailer.

2. A trailer according to claim 1 wherein said steering means includes connecting means interconnecting the wheels on each said yoke for pivoting said wheels in unison about their vertical axes.

3. A trailer according to claim 2 wherein said steering means includes linkage means interconnecting said tow bar with one wheel on each said yoke whereby pivoting of said tow bar about its vertical axis causes said wheel to pivot about its vertical axis.

4. A trailer according to claim 3 wherein said linkage means includes a steering lever secured to said tow-bar; said lever being pivotable about said first vertical axis, and tie bars interconnecting said lever with each said front wheel, said tie bars being horizontally and vertically pivotable about said lever.

References Cited
UNITED STATES PATENTS

| | | | |
|---|---|---|---|
| 2,260,574 | 10/1941 | Martin | 280—124 |
| 2,675,247 | 4/1954 | Meng | 280—141 X |
| 2,759,742 | 8/1956 | Kriesel | 280—141 |
| 2,901,264 | 8/1959 | Hart | 280—104.5 X |
| 3,147,989 | 9/1964 | Maehren | 280—140 X |
| 3,211,467 | 10/1965 | Siddall | 280—103 X |

LEO FRIAGLIA, *Primary Examiner.*

R. FRIAGLIA, *Assistant Examiner.*